(12) United States Patent
Mathew et al.

(10) Patent No.: US 8,903,215 B2
(45) Date of Patent: Dec. 2, 2014

(54) ENCLOSURE-LESS FIBER OPTIC TERMINALS

(75) Inventors: Biji Mathew, Kochi (IN); Sudhakaran K. Sanith, Kochi (IN); Mukund Muraleedharan, Kochi (IN)

(73) Assignee: Opterna Technology Limited, Limerick (IE)

(*) Notice: Subject to any disclaimer, the term of this patent is extended or adjusted under 35 U.S.C. 154(b) by 140 days.

(21) Appl. No.: 13/300,727

(22) Filed: Nov. 21, 2011

(65) Prior Publication Data

US 2012/0063735 A1 Mar. 15, 2012

(51) Int. Cl.
*G02B 6/00* (2006.01)
*G02B 6/44* (2006.01)
*G02B 6/38* (2006.01)

(52) U.S. Cl.
CPC ............ *G02B 6/4446* (2013.01); *G02B 6/4477* (2013.01); *G02B 6/3897* (2013.01); *G02B 6/4457* (2013.01); *G02B 6/4471* (2013.01); *G02B 6/3825* (2013.01); *G02B 6/4466* (2013.01)
USPC ............ 385/135; 385/134; 385/136; 385/137

(58) Field of Classification Search
USPC .................................. 385/134, 135, 136, 137
See application file for complete search history.

(56) References Cited

U.S. PATENT DOCUMENTS

| | | |
|---|---|---|
| 5,511,144 A | 4/1996 | Hawkins et al. |
| 5,551,545 A | 9/1996 | Gelfman |
| 6,220,413 B1 | 4/2001 | Walters et al. |
| 6,396,989 B1 | 5/2002 | Johnston et al. |
| 6,554,221 B2 | 4/2003 | Hinds |
| 6,634,794 B1 | 10/2003 | Daoud et al. |
| 6,711,339 B2 | 3/2004 | Puetz et al. |
| 6,796,721 B2 | 9/2004 | Matsumoto et al. |
| 7,017,846 B2 | 3/2006 | Tsoi et al. |
| 7,292,763 B2 | 11/2007 | Smith et al. |
| 7,327,926 B2 | 2/2008 | Barth et al. |
| 7,329,049 B2 | 2/2008 | Meek et al. |
| 7,340,144 B2 | 3/2008 | Dobbins et al. |
| 7,346,253 B2 | 3/2008 | Bloodworth et al. |
| 7,623,749 B2 | 11/2009 | Reagan et al. |

(Continued)

FOREIGN PATENT DOCUMENTS

| | | |
|---|---|---|
| EP | 0 943 944 A1 | 9/1999 |
| JP | 61-90104 | 5/1986 |
| WO | WO 2008/124293 A1 | 10/2008 |

OTHER PUBLICATIONS

International Search Report and Written Opinion for International Appl. No. PCT/US2012/066271, European Patent Office, The Netherlands, mailed on Jul. 24, 2013, 17 pages.

(Continued)

*Primary Examiner* — Jennifer Doan
(74) *Attorney, Agent, or Firm* — Sterne, Kessler, Goldstein & Fox P.L.L.C.

(57) ABSTRACT

An enclosure-less fiber optic terminal can include a base plate, a spool, an adapter, and an adapter plate. The spool can be rotatably mounted to the base plate. The spool can house an input fiber cable. The adapter can secure a connection between a fiber of the input fiber cable and a fiber of an output fiber cable. The adapter plate has a cable guide defining a channel for routing the output fiber cable from the adapter.

16 Claims, 21 Drawing Sheets

(56) References Cited

U.S. PATENT DOCUMENTS

| | | |
|---|---|---|
| 7,756,379 B2 | 7/2010 | Kowalczyk et al. |
| 7,889,962 B2 | 2/2011 | Nair et al. |
| 7,894,701 B2 | 2/2011 | Kowalczyk et al. |
| 8,081,857 B2 | 12/2011 | Nair et al. |
| 8,081,858 B2 | 12/2011 | Nair et al. |
| 8,265,447 B2 * | 9/2012 | Loeffelholz et al. .......... 385/135 |
| 2005/0105879 A1 | 5/2005 | Kanasaki et al. |
| 2006/0210230 A1 | 9/2006 | Kline et al. |
| 2008/0292261 A1 | 11/2008 | Kowalczyk et al. |
| 2009/0074370 A1 | 3/2009 | Kowalczyk et al. |
| 2010/0166376 A1 | 7/2010 | Nair et al. |
| 2010/0310224 A1 | 12/2010 | Kowalczyk et al. |
| 2011/0176784 A1 | 7/2011 | Nair et al. |

OTHER PUBLICATIONS

The Notificaton of Transmittal of the International Search Report and Written Opinion of the International Searching Authority issued in Int'l Patent Application No. PCT/US2009/068520, prepared Feb. 12, 2010, and mailed Feb. 26, 2010, 9 pages.

Office Communication, dated Aug. 4, 2010, for U.S. Appl. No. 12/347,624, filed Dec. 31, 2008, 10 pages.

Notice of Allowance, dated Jan. 1, 2011, for U.S. Appl. No. 12/347,624, filed Dec. 31, 2008, 7 pages.

Invitation to Pay Additional Fees and, where Applicable, Protest Fee, including Communication Relating to the Results of the Partial International Search Report, for Int'l Patent Application No. PCT/US2012/066271, Feb. 26, 2013, 5 pages.

* cited by examiner

ENCLOSURE-LESS FIBER OPTIC TERMINALS

BACKGROUND

1. Field

The present invention relates to enclosure-less fiber optic terminals.

2. Background

A fiber distribution terminal (FDT) is used to interconnect multiple fibers, typically originating from a common point, and distribute them to multiple different locations with output fiber cables. Typically, the connections are made between a larger multi-fiber bundle input cable and individual output fiber cables. An FDT is typically used in buildings such as multi-unit residences or commercial/office buildings. There could be a single FDT per building or perhaps one or more per floor or any combination in between depending on the fiber connection needs and capacity of the building.

One recurring issue faced when dealing with the installation of FDTs is how much input fiber cable is required to connect the FDT to some common point, which is often outdoors where the connections to the larger fiber networks (e.g., a city wide fiber network) are made. The common point could also be within the same building, perhaps on another floor or in the basement of the building. No matter the location of the common point, it is often necessary to physically locate the FDT before the required length of fiber cable between the FDT and the common point is known. This presents two problems. First, one must approximate and prepare a length of the input fiber cable before installing the FDT. If the approximated length is too short, the connection to the FDT cannot be made without a fiber cable splice and another length of input fiber cable. Conversely, if the approximated length is too long, then the excess slack of the fiber cable must be stored somewhere along the length of fiber cable, potentially introducing unwanted bends and thus unwanted bend loss into the fiber cable path. Second, it might be necessary to relocate the FDT so that the chosen or available fiber cable length is approximately correct, which could mean placing the FDT in an undesirable location. Accordingly there is a need to safely store excess fiber cable after installation and to feed fiber cable from an installed FDT. There is also a need for a convenient way to store the input fiber cable prior to installation of the FDT.

Affixing the FDT to its permanent location before connecting the input fiber cable to the common point would be convenient. Prior FDTs that include an external spool of fiber cable do not allow the FDT to be affixed to its permanent location because the enclosure of the FDT must rotate with the external spool of fiber cable. This configuration also prevents the installer from making the input fiber connections to the adapter pack prior to connecting the input fiber cable.

In some FDTs, input and output fiber cables enter and exit the FDT in only one direction. This configuration requires that the cables always be routed in the same direction. This configuration often makes the external installation difficult and the routing of cables to and from the FDT cumbersome. This situation can occur when the fiber must be routed to a higher floor, but the fiber output cables are downwardly aligned, meaning that the fiber cables must make a 180 degree turn after leaving the FDT. This often results, especially with less experienced installers, in damage to the fiber cable, due to inadvertent bend loss.

It is also important to protect the fiber cables as they are routed within the FDT. Typical FDTs contain connection blocks where the fibers of the larger input cable are individually matched to single output cables. Both the input and output cables are separately routed through the enclosure, with the installer having the responsibility of routing the fiber cables in such a way so as to avoid bends in the cable and thus bend loss. Installers, who may or may not be conscious of this responsibility, might not always appreciate the impact of their craftsmanship. Routing secured by cable ties or other more industrial type retaining clips could easily create inadvertent bends in the fiber cables, thus causing undesired loss of signal strength in the fiber cables. Therefore, it is desirable to have an FDT that conveniently stores fiber cable prior to installation and houses excess fiber cable after the input cable connection has been made. It is also desirable for the FDT to house the input fiber cable to output fiber cable connections and safely route the cables within the FDT to avoid bend loss while allowing the input and output fiber cables to enter/exit from multiple sides of the FDT.

SUMMARY

An FDT includes a base plate, a spool, and an adapter pack having an adapter for securing a connection between a fiber of an input fiber cable and a fiber of an output fiber cable, and an adapter plate. The spool is rotatably mounted to the base plate, and houses the input fiber cable. The adapter plate includes a cable guide defining a channel for routing the output fiber cable from the adapter pack.

BRIEF DESCRIPTION OF THE DRAWINGS

Embodiments of the invention will now be described, by way of example only, with reference to the accompanying schematic drawings in which corresponding reference symbols indicate corresponding parts, and in which.

DETAILED DESCRIPTION

While the invention is described herein with reference to illustrative embodiments for particular applications, it should be understood that the invention is not limited thereto. Those skilled in the art with access to the teachings provided herein will recognize additional modifications, applications, and embodiments within the scope thereof and additional fields in which the invention would be of significant utility.

Figure 1:
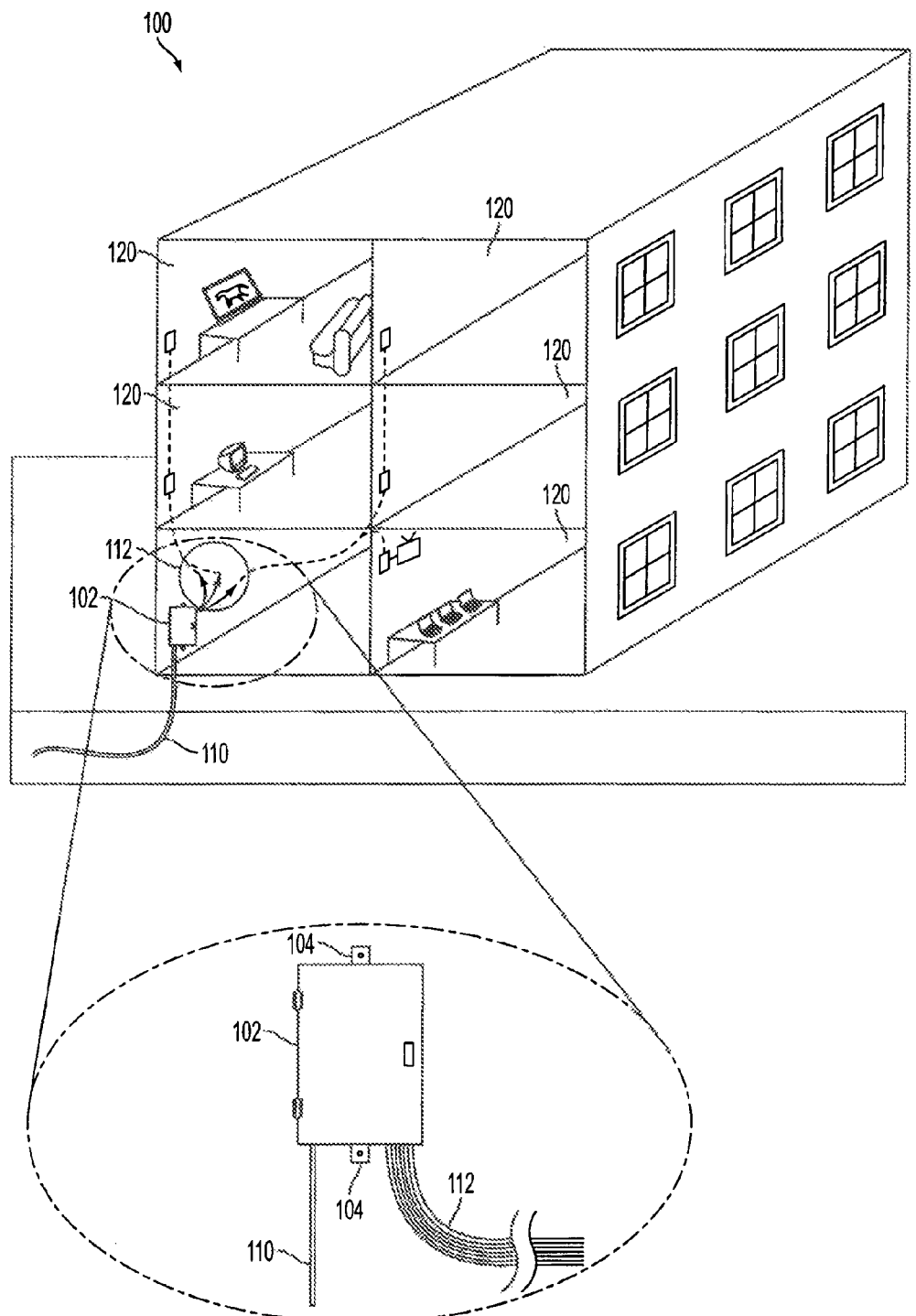
FIG. 1 depicts a multi-unit building which is a typical application situation for the use of a fiber distribution terminal (FDT)

FIG. 1 depicts a multi-unit building 100 according to one embodiment of the invention. The multi-unit building 100 includes several separate units 120, one or more of which have a necessity or desire to have fiber cable service in their unit. Each separate unit 120 typically only needs a single output fiber connection 112, but a typical situation in a multi-unit building 100 would have some plurality if not the entire building needing or desiring the fiber cable service. The fiber cable provider will run a larger bundled input fiber cable 110 to the multi-unit building 100 where it is routed and connected through an FDT 102. FDT 102 can be secured to a mounting surface, such as an interior wall within the building or a surface of a pre-installed electrical box, for example, in the basement or in a communication closet within the multi-unit building 100. Input fiber cable 110 is actually multiple fibers bundled together into a single, larger cable for easier routing to some central location. The input fiber cable 110 is inputted to FDT 102. At FDT 102, the individual fibers that compose input fiber cable 110 are separately connected to individual output cables 112. Then each output fiber cable 112 is routed to a separate unit 120, where the output fiber cable 112 can be connected to other equipment that is capable of translating the fiber cable signal into useful information.

Figure 2:
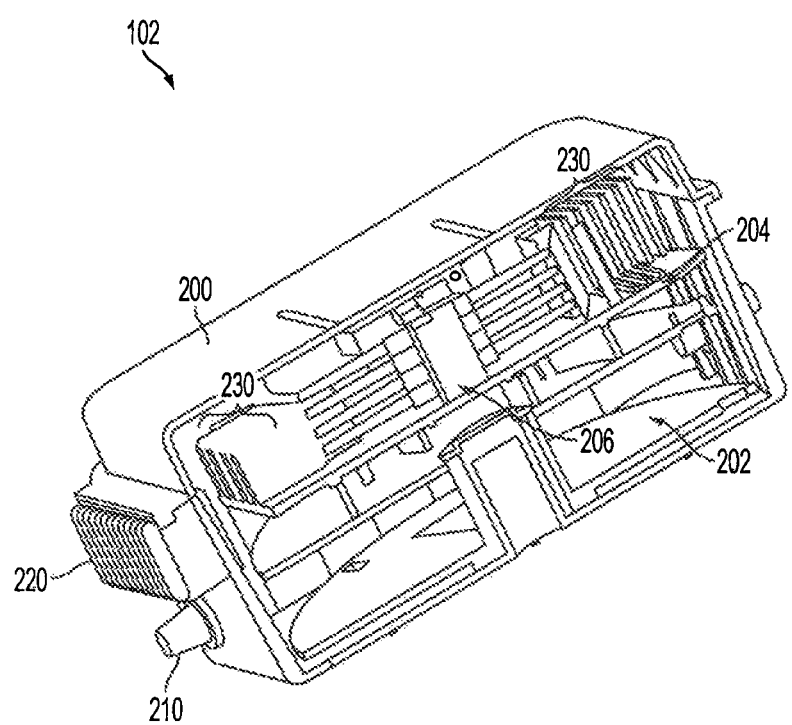
FIG. 2 is a cross-sectional view of an FDT according to an embodiment that includes an enclosure.

FDT 102 comprises several components. FDT 102 can include a spool 202, an adapter plate 204, and one or more adapter packs 206. In some embodiments, FDT 102 can also include an environmentally sealed enclosure to protect the connections from environmental dangers. In other embodiments, FDT 102 does not include an environmentally sealed enclosure. FIG. 2 is a cross-sectional view of one embodiment including an environmentally sealed enclosure 200. Internal to enclosure 200 is spool 202, adapter plate 204, and a plurality of adapter packs 206. Enclosure 200 includes openings for passing one or more input fiber cables 110 and a plurality of output fiber cables 112 cables. These openings are filled and secured with an input grommet 210 and a set of output grommets 220.

Spool 202 is disposed within enclosure 200 in such a way that it is free to rotate inside enclosure 200. Spool 202 includes a first spooling area 240 defined by a lower flange 242 and an intermediate flange 244. Spool 202 also includes a second spooling area 246 defined by intermediate flange 244 and adapter plate 204. First spooling area 240 is used to spool a first portion 304 (see FIG. 3) of input fiber cable(s) 110 having multiple individual fibers (e.g., six or twelve fibers) within a single fiber jacket. First spooling area 240 can be sized to spool 50 ft., 100 ft., 200 ft., 350 ft., or more than 350 ft. of the first portion of input fiber cable 110. First portion 304 of input fiber cable(s) 110 is fed through input grommet 210 in enclosure 200, and can be extended to the maximum storage capacity of first spooling area 240. If two input fiber cables 110 are stored, they must be extended together. Input fiber cable(s) 110 can also include a second portion 306 (see FIG. 3) including a plurality of individual input fiber cables 306 (see FIG. 3) that are unbundled from first portion 304, for example, by using a fan out device (not shown). Second spooling area 246 is used to spool the plurality of individual input fiber cables of second portion 306. The ends of individual input fiber cables 306 can have connectors, for example, a Splice Closure/Angled Physical Contact (SC/APC) connector.

Adapter plate 204 is coupled to and rotates with the spool 202. Adapter plate 204 can be integral with spool 202 or can be a separate part attached to spool 202 by any suitable attachment means, for example, fasteners. Adapter plate 204 can include a set of fiber cable guides 230 further described below with reference to FIG. 3.

FDT 102 can be shipped with input fiber cable(s) 110 already installed on spool 202, including first portion 304 stored in first spooling area 240 and the individual input fiber cables of second portion 306 stored in second spooling area 246. Thus, FDT 102 can also serve as a shipping container for input fiber cable(s) 110.

Figure 3:
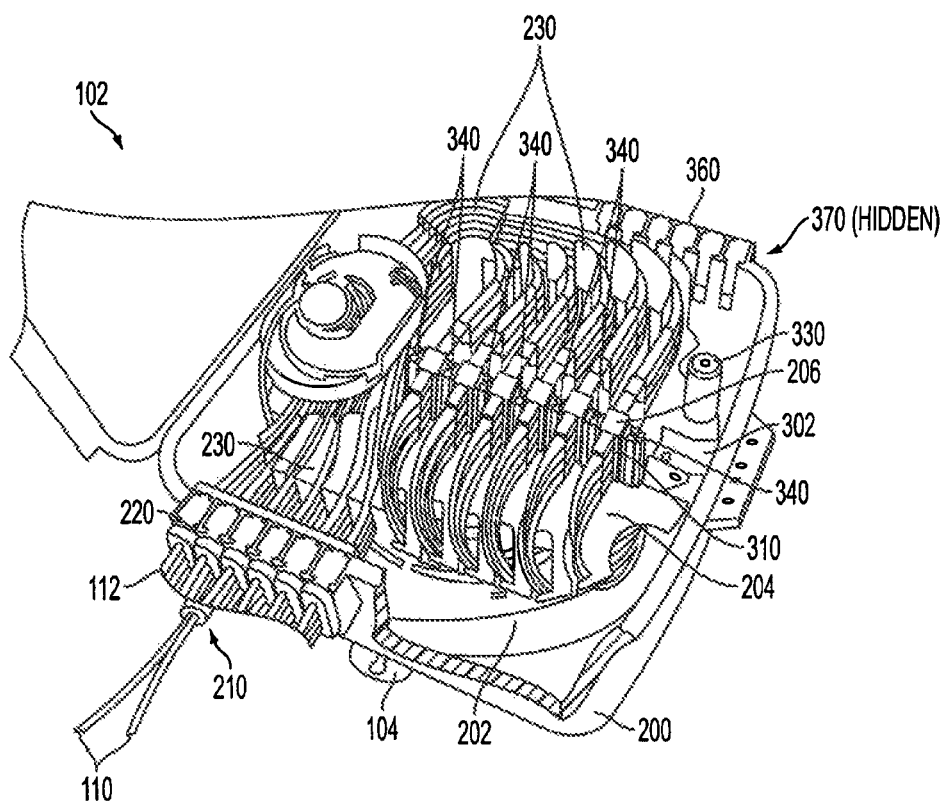
FIG. 3 is an internal view (with the enclosure door open) showing the adapter plate cable routing and the adapter pack cable connections with the internal spool disposed beneath.

FIG. 3 is an internal view (with the door of enclosure 200 open) of FDT 102. FDT 102 can also include a spool lock 302, a plurality of adapters 310, for example, SC/APC adapters, a handle 330, an input plug 370, and output plugs 360.

As shown in FIG. 3, input grommet 210, which will be described in more detail below, can receive two separate bundled input fiber cables 110, each containing multiple individual fibers. The portion of input fiber cable 110 that is fed through the input grommet 210 is then connected via other fiber network components (not shown) to a larger fiber network (e.g., street connection or larger). Each individual unbundled fiber cable of second portion 306 is connected to an SC/APC adapter 310. FDT 102 includes a plurality of adapter packs that house a plurality of SC/APC adapters 310, for example, four SC/APC adapters 310 as shown in FIG. 3. Adapter packs 206 are disposed on adapter plate 204 by using a series of adapter posts 340. For example, if there are six adapter packs 206 housing SC/APC adapters 310, there would be seven adapter posts 340 for positioning the adapter packs 206. Each adapter pack 206 is slidably engaged with a pair of adapter posts 340. Accordingly, adapter packs 206 and SC/APC adapters 310 can slide up and down relative to adapter posts 340.

Adapter plate 204 also defines a plurality of guidance slots 350 that provide a convenient and safe way to route the individual fiber cables of second portion 306 of input fiber cable(s) 110 from second spooling area 246 of spool 202 to the SC/APC adapters 310 located on the opposite side of the adapter plate 204 from spooling area 246. In one embodiment, there are six guidance slots 350 so that four individual fiber cables of second portion 306 of input fiber cable(s) 110 can be routed through each slot 350 to the respective adapter pack 206.

The spool 202 can feed input fiber cable(s) 110 through the input grommet 210 up to the maximum spool capacity. First portion 304 of input fiber cable 110 is then routed as needed and any excess of first portion 304 can be manually retracted onto spool 202 through input grommet 210 by turning handle 330. The excess of first portion 304 of input fiber cable(s) 110 does not have to be stored outside of FDT 102, but rather can be safely re-spooled onto first spooling area 240 of spool 202. This helps avoid unnecessary damage such as bends or pinches of input fiber cable(s) 110, which can drastically reduce the signal quality that input fiber cable(s) 110 are capable of transmitting.

One end of output fiber cables 112 mates with SC/APC adapters 310 so that output fiber cables 112 can be optically coupled to the unbundled individual fiber cables of second portion 306 of input fiber cable(s) 110. In embodiments having enclosure 200, the end of the output fiber cable 112 to which the SC/APC adapter 310 is attached is within FDT enclosure 200.

Output fiber cables 112 are routed from adapter packs 206 through a series of guides 230 to output grommets 220. Guides 230 are coupled to adapter plate 204. Guides 230 route output fiber cables 112 in a safe and organized manner. In one embodiment, guides 230 extend perpendicular from the plane of adapter plate 204. Guides 230 define a plurality of curved channels for receiving output fiber cables 112. The curved channels of guides 230 can have specific radii that do not allow output fiber cables 112 to bend more than the specification of output fiber cable 112 allows, thereby minimizing bend loss within output fiber cables 112. Thus, guides 230 provide a convenient and organized way to route the output fiber cables 112 through FDT 102.

Guides 230 are designed to maintain output fiber cable 112 signal integrity. Adapter plate 204 and guides 230 are sized such that up to 70 mm cable connection boots, which are sleeves usually made of a flexible material that add a layer of protection to the connector, and up to 4.8 mm diameter cables can be used. Adapter plate 204 and guides 230 are also sized such that the use of Splice On Connectors (SOCs) is facilitated. SOCs eliminate the need for field polishing of fiber cables to terminate connections. In one embodiment, there are at least three sets of guides 230 so that the output fiber cables 112 can make two 90 degree turns and be fanned out in order to line-up output fiber cables 112 with output grommets 220. However, more or less guides 230 may be needed based on the internal routing of enclosure 200, if included, and the bend tolerance specification of the particular output fiber cables 112 used. As mentioned above, output fiber cables 112 are routed out of enclosure 200 through output grommets 220. The number of output grommets 220 depends on the number of output fiber cables 112 used with FDT 102. In one embodiment, there are six output grommets 220 that each hold four output fiber cables 112.

As part of adapter plate 204, there is at least one spool lock 302. Spool lock 302 is designed so that, when engaged, it fixes the rotation of spool 202 to a single position, impeding further rotation of spool 202. In one embodiment, spool lock 302 is a sliding latch that engages a pair of tabs designed into a wall of enclosure 200. The introduction of spool lock 302 allows the input and output fiber cables 110 and 112 of FDT 102 to be routed from one of a plurality of sides of enclosure 200. This flexibility of fiber cable routing can drastically improve the craftsmanship of FDT 102 installation. To maintain an environmentally sealed enclosure 200, it is necessary to plug any of the input and output openings which are not used to route either input fiber cable(s) 110 or output fiber cables 112. To accomplish this, at least one input plug 370 that is identical in shape to input grommet 210 but is a single solid piece, and a plurality of output plugs 360 that are identical in shape to output grommets 220 but are solid pieces, are placed in the unused openings of enclosure 200.

Figure 4:
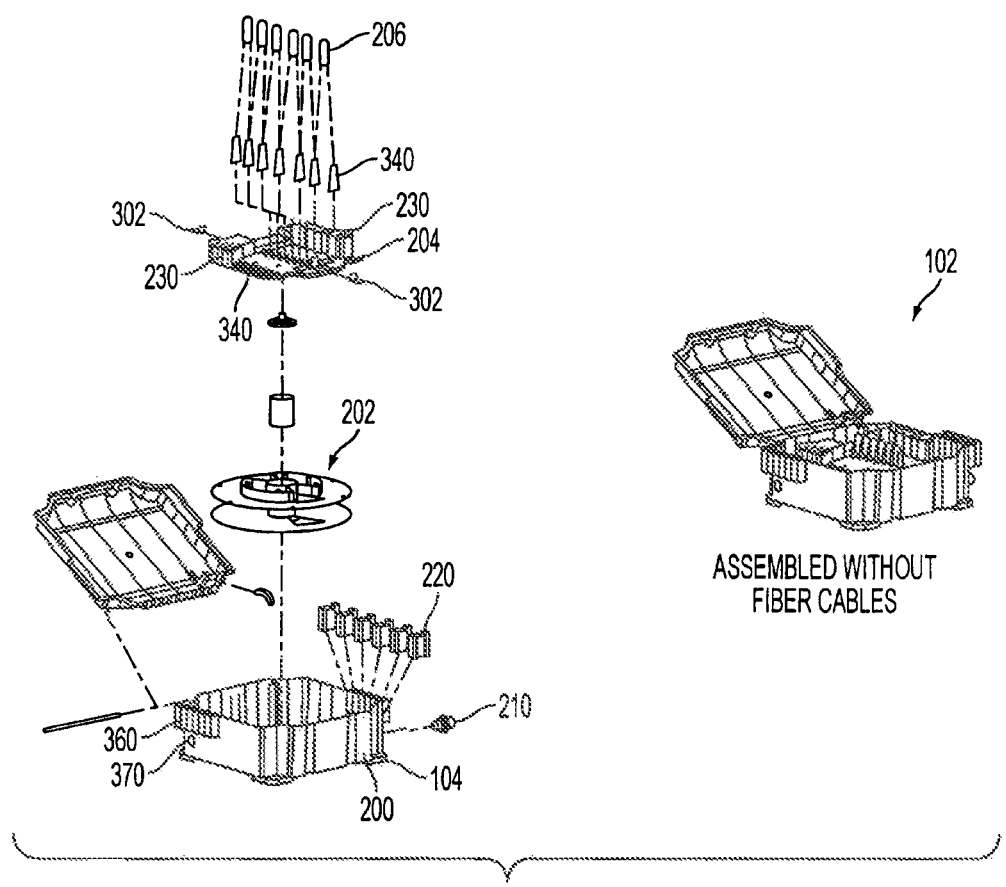
FIG. 4 is an exploded view of the elements of an FDT.

FIG. 4 is an exploded view of the elements of FDT 102. No new parts are introduced, but the view allows for a better perspective of how the parts are coupled together. Adapter packs 206 are shown in FIG. 4 as an elongated component that fits between adapter posts 340. Adapter packs 206 house one or more adapters 310 that provide the mated connection between input fiber cable(s) 110 and output fiber cables 112. In FIG. 4, handle 330 is not shown. Input fiber cable(s) 110 and output fiber cables 112 that are used with FDT 102 are not shown in FIG. 4 to make the main parts of FDT 102 visible. Input and output plugs 360 and 370 are more visible in this perspective view.

Figure 5:
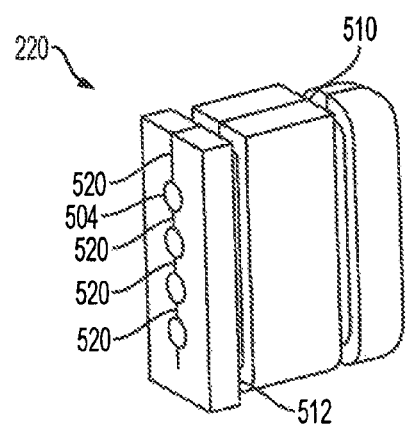
FIG. 5 depicts one of the output grommets capable of holding up to four output cables.

FIG. 5 depicts an output grommet 220. Output grommet 220 can hold up to four output fiber cables 112. Output grommet 220 includes a pair of channels 510 and 512, at least one void 504, and a split 520 down the center of the axis which cuts through cylindrical void 504 of output grommet 220. Channels 510 and 512 are configured to slip over protrusions fashioned in enclosure 200 so that output grommet 220 effectively seals itself in place, thereby keeping external environmental elements (e.g., water, bugs, etc.) out of enclosure 200. Output grommet 220 is designed for a tight fit against enclosure 200 protrusions, which helps create an effective seal, Void 504 provides an avenue for output fiber cable(s) 112 to be routed outside enclosure 200. In one embodiment, void 504 can hold output fiber cables 112 in a range of sizes from 2 mm. to 5 mm. in diameter. Void 504 is able to hold this range and also seal against components of the external environment because of internal output grommet 220 features which will be disclosed below in reference to FIG. 6, In one embodiment, output grommet 220 has four cylindrical voids 504 such that each grommet 220 can hold four output fiber cables 112. In this embodiment, there are a total of six output grommets 220.

Figure 6:
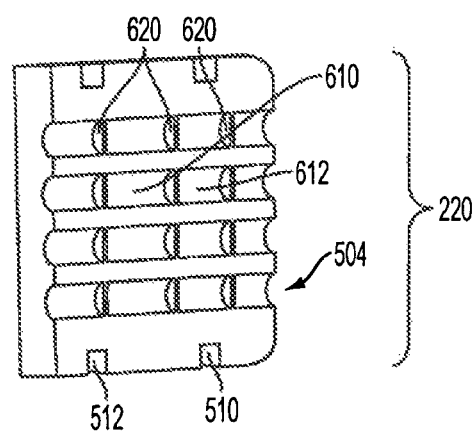
FIG. 6 is a cross-sectional view of the output fiber cable grommet of FIG. 5 showing the different chambers internal to the grommet.

FIG. 6 is a cross-sectional view of output grommet 220 as shown in FIG. 5, showing two different chambers 610 and 612 internal to output grommet 220. Internal to each cylindrical void 504 there are one or more ribs 620 that are manufactured in such a way that they block the path through cylindrical void 504, but are pliable enough that ribs 620 migrate when an output fiber cable 112 is placed through cylindrical void 504 and seal around output fiber cable 112. In one embodiment, output grommet 220 includes three ribs 620 in each void 504. This creates two void regions within the output grommet 220 that are described as chambers 610 and 612. Chambers 610 and 612 can then be filled, if desired, with a sealing material to further ensure that an environmental seal is made between the environmental side of output grommet 220 and the enclosure side of output grommet 220. Output fiber cables 112 are placed into output grommet 220 by forcing the two halves of output grommet 220 apart at axis split 520. Then an output fiber cable 112 can be placed into one cylindrical void 504. After which the two halves of output grommet 220 can be allowed to spring back together. Rib 620 is pliable enough but yet encompasses output fiber cable 112 such that as small as a 2 mm. fiber cable and as large as a 5 mm. fiber cable are locked in place, and an environmental seal is created around the fiber cable without damaging the fiber cable.

Figure 7:
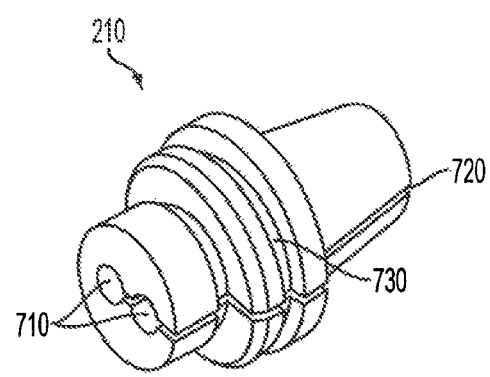
FIG. 7 depicts the input grommet capable of holding up to two, twelve fiber input fiber cables.

FIG. 7 depicts an input grommet 210 capable of holding up to two, twelve fiber input cables 110. Input grommet 210 features a mounting channel 730, a split 720, and at least one input cable void 710. These features function similarly to those of output grommet 220 described above with reference to FIGS. 5 and 6. In one embodiment, the difference is that input grommet 210 has only one channel which helps form a seal against the wall of enclosure 200 at the input grommet cutout. Otherwise, the void 710, ribs (not shown), and chambers (not shown) behave in the same manner as the corresponding parts of output grommet 220. Input fiber cable(s) 110 are locked into position by input grommet 210 while under typical stationary tension. However, input grommet 210 is designed such that an installer can feed input fiber cable(s) 110 through the installed input grommet 210 from spool 202 and can also retract input fiber cable(s) 110 back onto spool 202 through input grommet 210 without damaging input fiber cable(s) 110.

Figure 8:
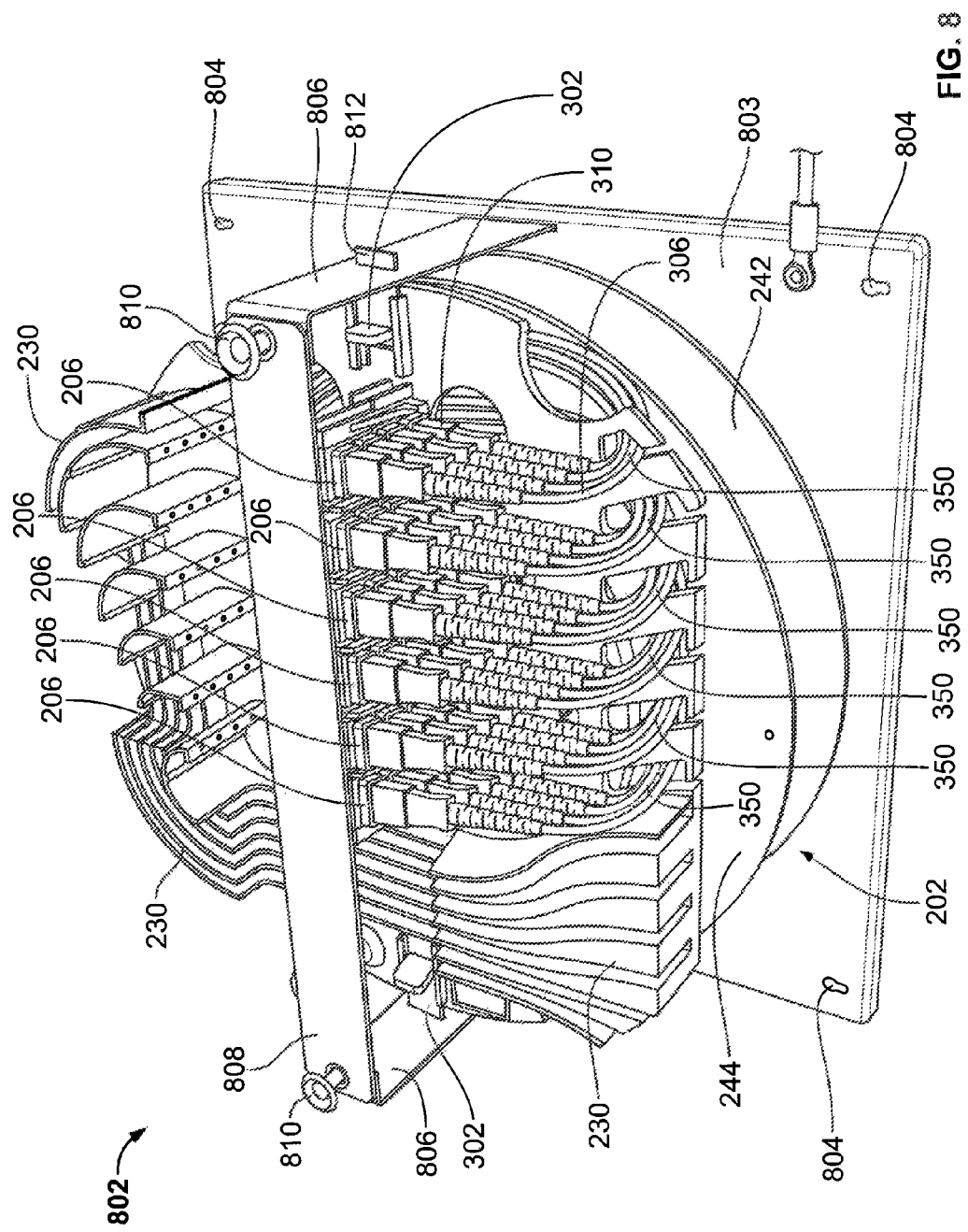
FIG. 8 depicts an FDT according to an embodiment that does not include an enclosure.

FIG. 8 illustrates an FDT 802 according to an embodiment in which FDT 802 does not include enclosure 200. In this embodiment, FDT 802 includes spool 202, adapter packs 206, and adapter plate 204 as described above in other embodiments. Spool 202, which houses input fiber cable(s) 110 (not shown in FIG. 8), is rotatably mounted to a base plate 803. Base plate 803 is substantially flat for mounting against a mounting surface. Base plate 803 includes a plurality of mounting holes 804. Fasteners can be placed through mounting holes 804 to securely mount FDT 802 to the mounting surface. In other embodiments, other suitable means of attachment can used to mount base plate 803 to the mounting surface. Base plate 803 can be made of any suitable rigid material, for example, wood, plastic, or metal. The mounting surface can be any surface at a desired location for FDT 802. For example, the mounting surface can be a back surface of a pre-installed electrical enclosure, a wall of a building, or any other suitable surface.

FDT 802 includes a pair of locking posts 806. Locking posts 806 extend from a surface of base plate 803. Locking posts 806 can each have an inverted L-shape. Locking posts 806 are aligned with adapter packs 206. The ends of locking posts 806 can be substantially aligned with the ends of adapter packs 206, including adapters 310. Locking posts 806 can be made of any suitable rigid material, for example, wood, plastic, or metal. FDT 802 includes a locking plate 808. Locking plate 808 extends between the pair of locking posts 806, covering adapter packs 206 and adapters 310. When locking plate 808 covers adapter packs 206 and adapters 310, adapter packs 206 and adapters 310 cannot be moved relative to adapter posts 340. Locking plate 808 has a pair of retention pins 810 that selectively engage the ends of locking posts 806 to securely lock plate 808 over adapter packs 206 and adapters 310.

Locking posts 806 can each have a slot 812 configured to receive spool lock 302. For example, slot 812 can be rectangular to correspond to the rectangular latch of spool lock 302. When spool lock 302 is engaged with slot 812, rotation of spool 202 relative to base plate 803 is substantially prevented.

Figure 9:
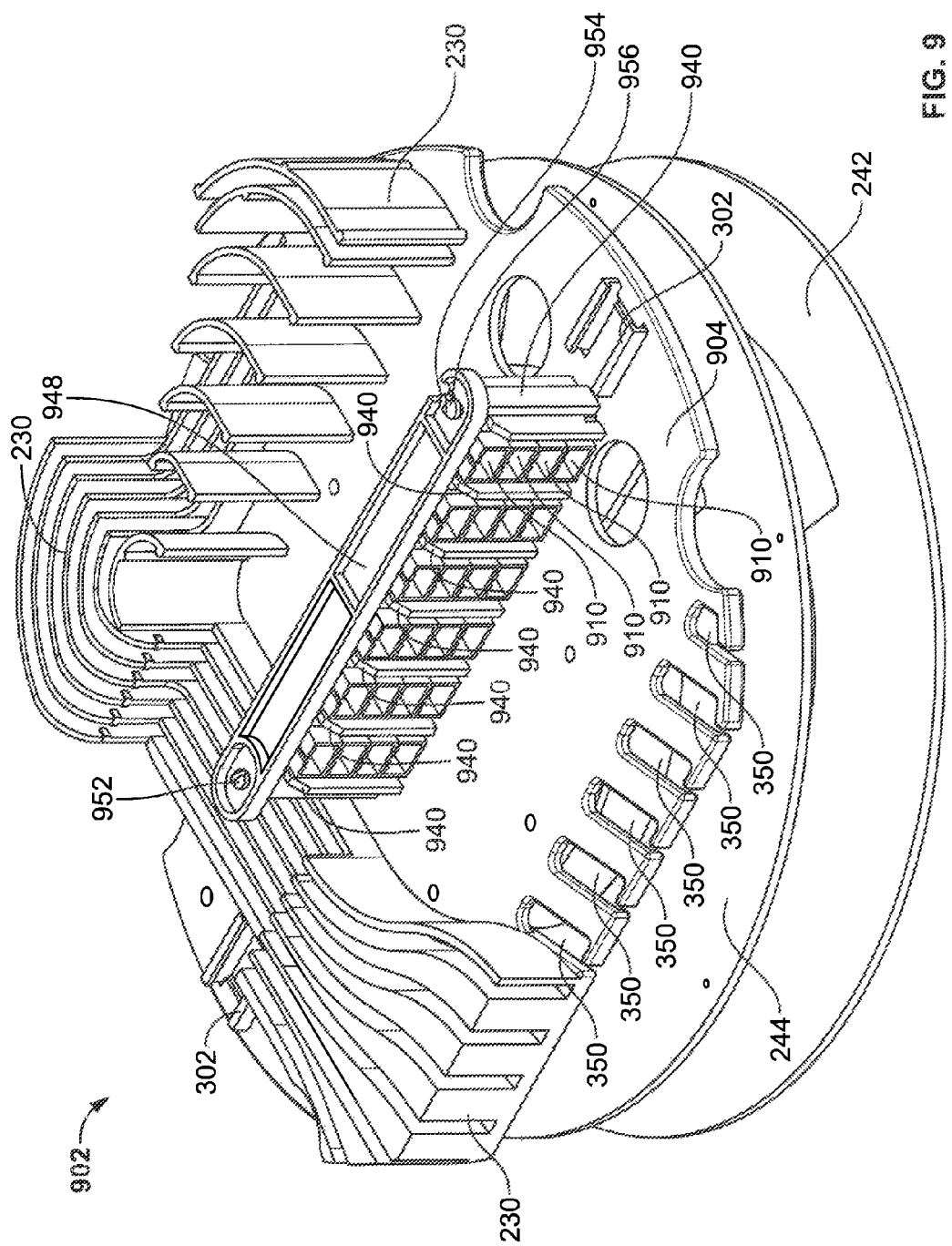
FIG. 9 depicts an FDT with an alternative adapter retaining system.
Figure 10:
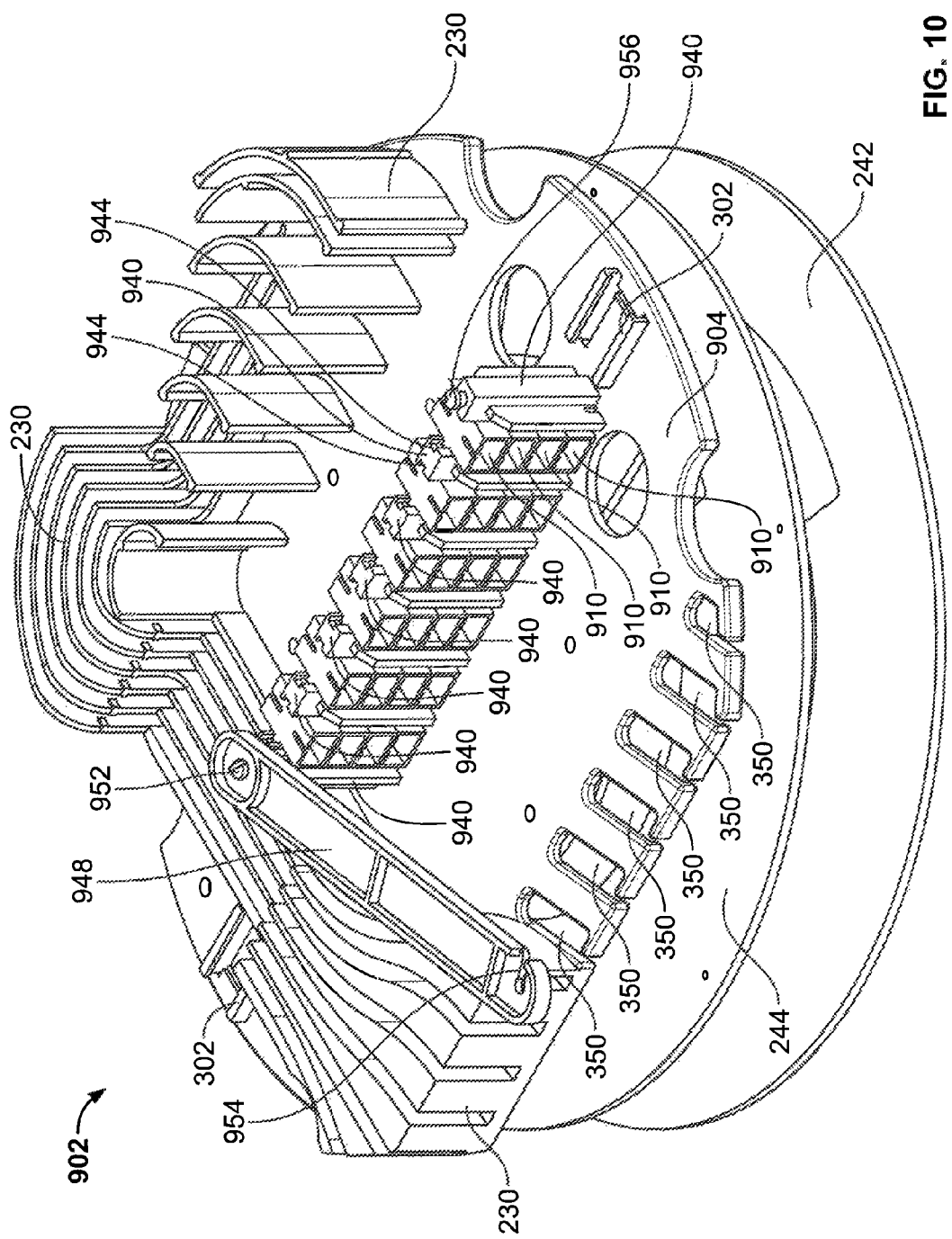
FIG. 10 depicts the FDT of FIG. 9 with the locking plate at a position that allows the adapters to slide relative to the adapter posts.
Figure 11:
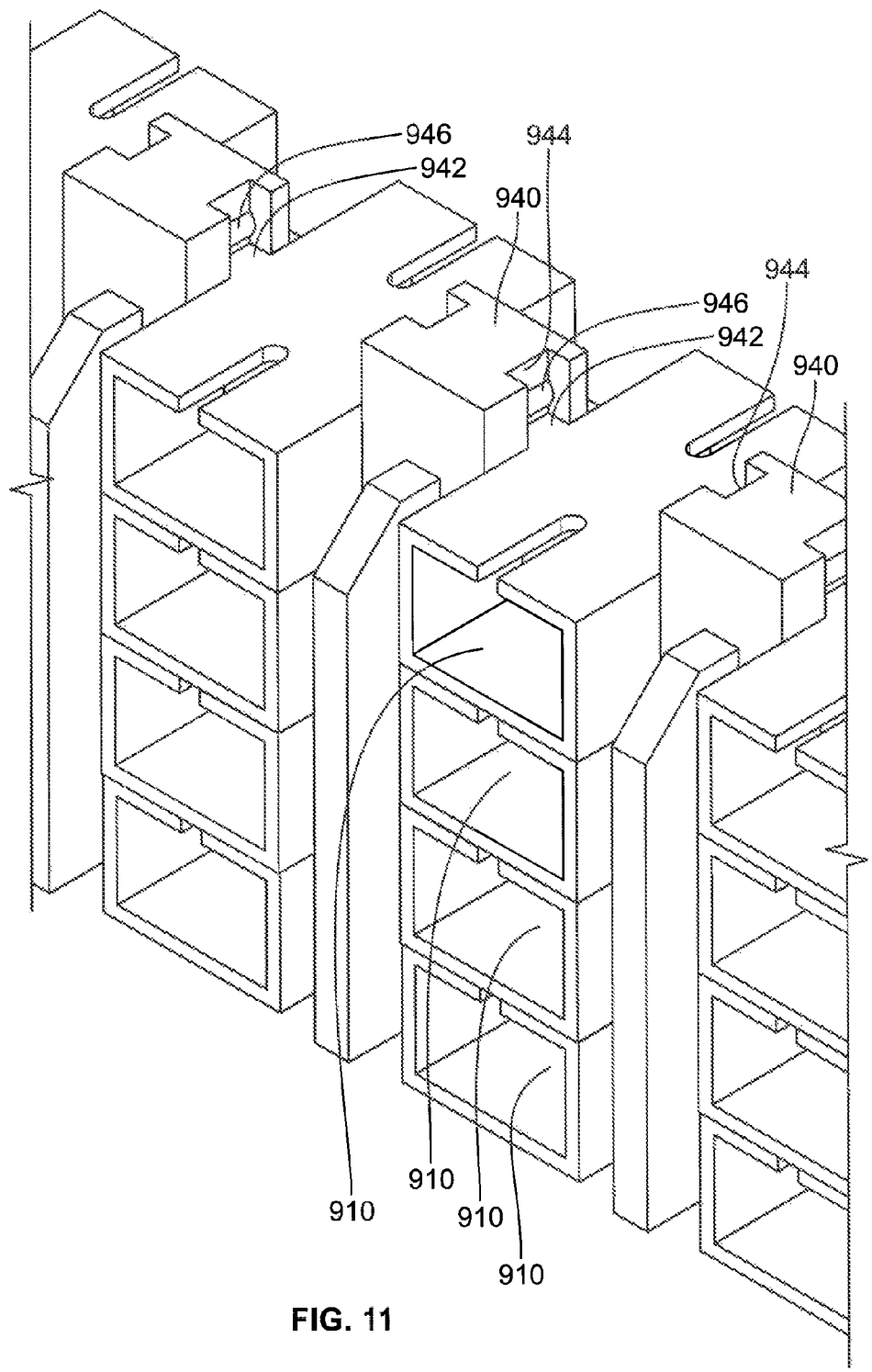
FIG. 11 is an enlarged portion of the FDT as shown in FIG. 10.

FIGS. 9-17 illustrate alternative embodiments of systems for retaining the adapters. FIGS. 9-11 illustrate one alternative adapter retaining system. FDT 902 includes an adapter plate 904 having a series of adapter posts 940 and a plurality of adapters 910. Adapters 910 are directly and slidably disposed between each pair of adapter posts 940. Adapter packs 206 are omitted. Adapters 910 can slide relative to adapter posts 940, while all other movement of adapters 910 is substantially restricted. As shown in FIGS. 9 and 10, four adapters 910 can be disposed between each pair of adapter posts 940, forming a linear stack of adapters 910. In other embodiments, more or less than four adapters 910 can be disposed between each pair of adapter posts 940. For example, two adapters 910 or six adapters 910 can be disposed between each pair of adapter posts 940. Adapter posts 940 can be separate parts coupled to adapter plate 904, or adapter posts 940 can be integral with adapter plate 904.

As best seen in FIG. 11, which is an enlarged excerpt from FIG. 10, a sliding interface between adapters 910 and adapter posts 940 is formed, in part, by protrusions 942 extending outward from both sidewalls of adapter 910. Adapter posts 940 each have a longitudinal groove 944 that runs along the height of the adapter post 940. Grooves 944 are configured and sized to slidably receive the respective protrusions 942 of adapter 910. This sliding interface allows adapters 910 to slide relative to posts 940 in a direction away from or towards adapter plate 904, while substantially preventing all other movement of adapters 910 relative to posts 940. For example, an installer can move adapter 910 away from adapter plate 904 to gain easy access to adapter 910.

The protrusions 942 can be rounded or semi-circular to enable smooth entry of protrusions 942 into grooves 944 of adapter posts 940. Adapter posts 940 can also include retention ribs 946 that partially extend into grooves 944. Ribs 946 prevent adapters 910 from freely falling out of adapter posts 940 when FDT 102 is turned upside down, while also allowing adapters 910 to be removed from between adapter posts 940 when an adequate force is applied to adapters 910.

As shown in FIGS. 9 and 10, FDT 902 includes a lock that selectively prevents adapters 910 from sliding relative to adapter posts 940. The lock includes a locking plate 948 that is movable between a first position that prevents adapters 910 from sliding relative to adapters posts 940 (see FIG. 9), and a second position that allows adapters 910 to slide relative to adapter posts 940 (see FIG. 10). In this embodiment, locking plate 948 pivots in a plane substantially parallel to the plane of adapter plate 904. In a variation, locking plate 948 could be pivoted in a plane substantially perpendicular to the plane of adapter plate 904. For example, locking plate 948 can have an opening for receiving a pivot pin 952 extending from a surface of one adapter post 940. Accordingly, locking plate 948 pivots about pivot pin 952. At the end opposite pivot pin 952, locking plate 948 defines a slot 954. Slot 954 is sized and configured to receive a pin 956 extending from a surface of another adapter post 940. The head of pin 956 can be biased towards the adapter post 940 to pinch plate 948 against the adapter post 940 to maintain locking plate 948 in place.

Figure 12:
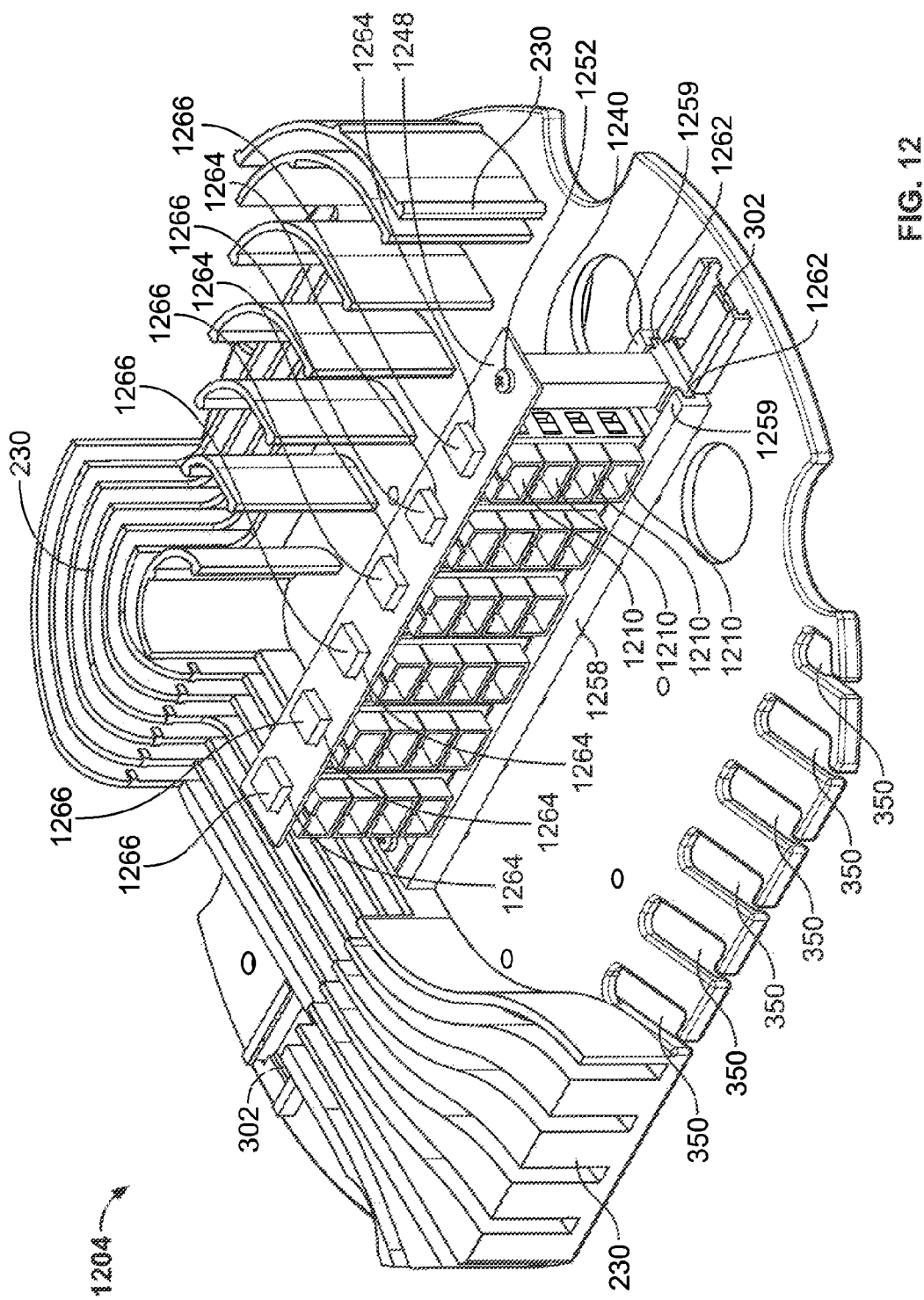
FIG. 12 depicts an adapter plate with an adapter retaining system according to an embodiment.
Figure 13A:
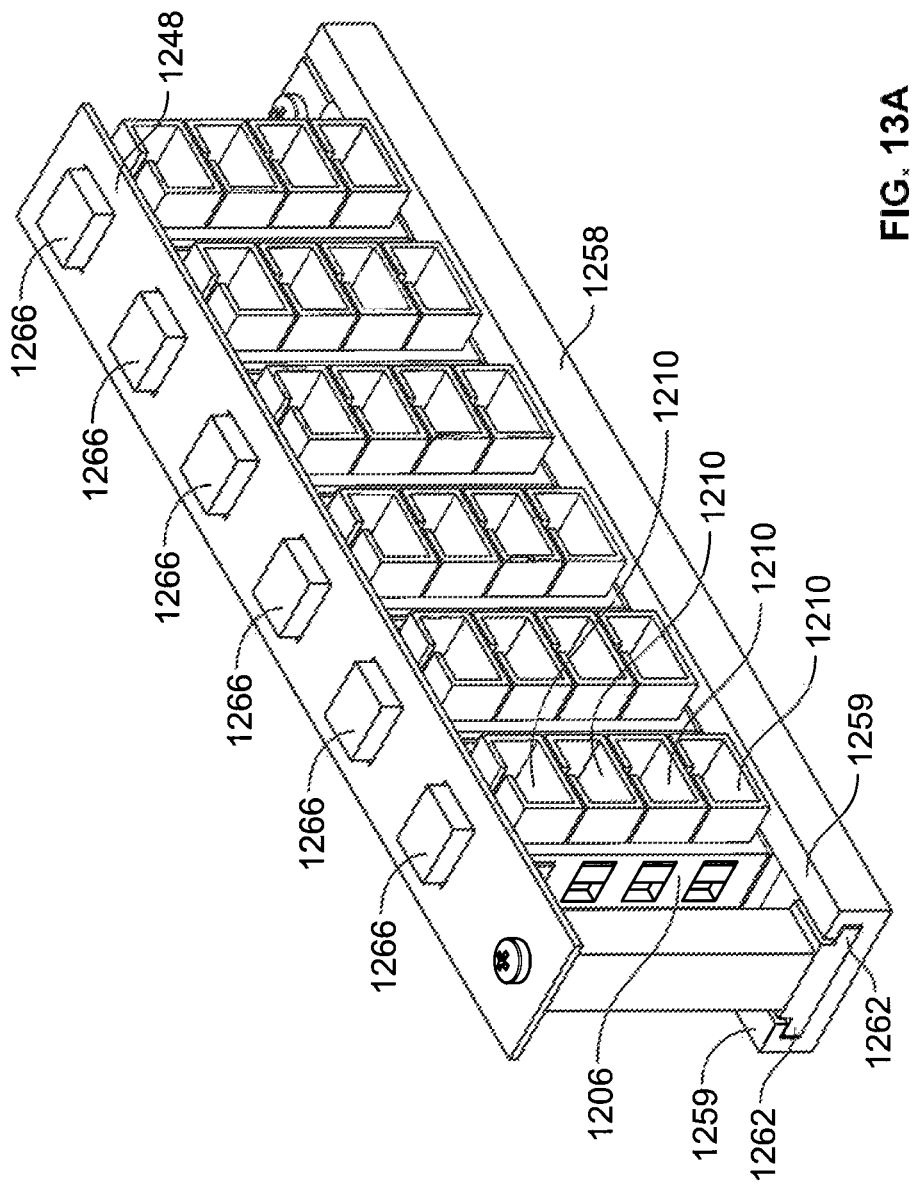
FIGS. 13A and 13B illustrate the adapter retaining system of FIG. 12.
Figure 13B:
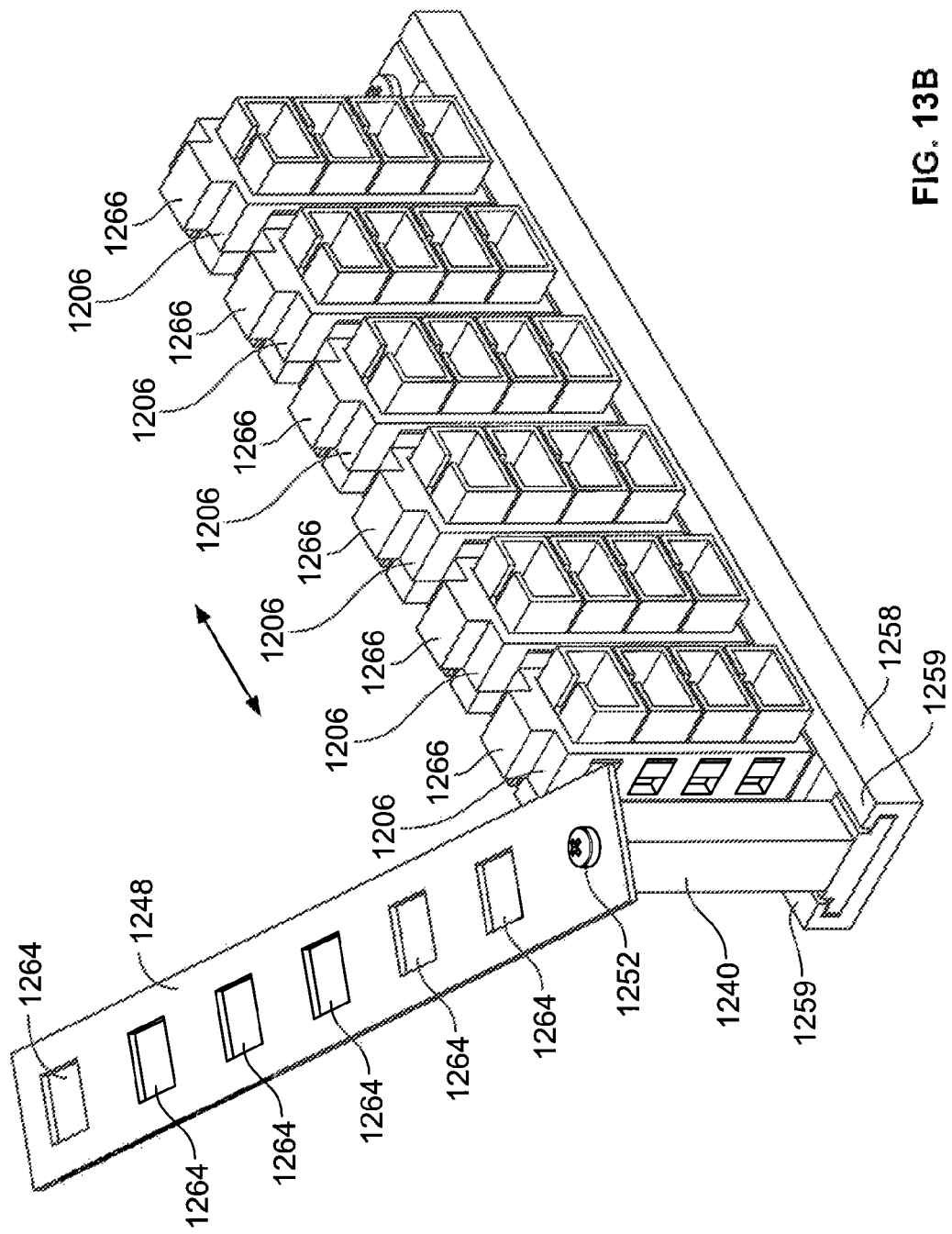

FIGS. 12, 13A, and 13B illustrate another embodiment of an adapter retaining system that can be used with an FDT. FIG. 12 illustrates a perspective view of an adapter plate 1204 without spool 202. Adapter plate 1204 includes a retaining base 1258. Retaining base 1258 can be a separate part coupled to adapter plate 1204, or retaining base 1258 can be integral with adapter plate 1204. Retaining base 1258 is configured to slidably receive one or more adapter packs 1206 along a plane substantially parallel to the plane of adapter plate 1204. Adapter packs 1206 are configured to house one or more adapters 1210. As shown in FIG. 12, retaining base 1258 can receive, for example, six adapter packs 1206. Retaining base 1258 can have a shoulder 1259 on each side. Shoulders 1259 define a channel for forming a sliding interface with a post 1240 and adapter packs 1206 as further described below.

Adapter plate 1204 includes post 1240. Post 1240 is configured to form a sliding interface with retaining base 1258. Post 1240 includes a pair of outwardly extending flanges 1262 at its base. Flanges 1262 are sized to closely fit within the channel defined by shoulders 1259 of retaining base 1258, creating a sliding interface there between. Accordingly, post 1240 can slide relative to retaining base 1258 in a linear direction that is substantially parallel to the plane of adapter plate 1204, but shoulders 1259 prevent post 1240 from moving away from adapter plate 1204. Adapter plate 1204 also includes a locking plate 1248. Locking plate 1248 can move between a first position forming a locking interface between locking plate 1248 and adapter packs 1206 that prevents adapter packs 1206 from sliding relative to retaining base 1258 in a direction that is substantially parallel to the plane of adapter plate 1204 (see FIG. 13A), and a second position that allows adapter packs 1206 to slide relative to retaining base 1258 in a direction that is substantially parallel to the plane of adapter plate 1204 (see FIG. 13B). In this embodiment, a pivot pin 1252 extends from a surface of post 1240, and locking plate 1248 is pivotally coupled to pivot pin 1252 such that locking plate 1248 pivots in a plane substantially parallel to the plane of adapter plate 1204. In a variation, locking plate 1248 could be pivoted in a plane substantially perpendicular to the plane of adapter plate 1204. Locking plate 1248 includes a plurality of openings 1264 for forming the locking interfacing with adapter packs 1206.

Adapter packs 1206 house one or more adapters 1210, for example, four adapters 1210 as shown in FIGS. 12, 13A, and 13B. Each adapter pack 1206 includes a pair of outwardly extending flanges (not shown) at its base sized to closely fit within the channel defined by shoulders 1259 of retaining base 1258, creating a sliding interface between adapter pack 1206 and retaining base 1258, similar to the sliding interface described above with reference to flanges 1262 of post 1240 and shoulders 1259 of retaining base 1258. Each adapter pack 1206 also has a protrusion 1266 extending from a surface of adapter pack 1206. Protrusions 1266 have a shape that closely corresponds to the shape of openings 1264 in locking plate 1248, for example, a square shape as shown in FIGS. 12, 13A, and 13B. Protrusion 1266 and opening 1264 can have any other suitable shape, for example, a circle or a triangle.

When locking plate 1248 is in the locking position as shown in FIG. 13A, protrusions 1266 of adapter packs 1206 pass through respective openings 1264 in locking plate 1248. This interface between protrusions 1266 and openings 1264 prevents adapter packs 1206 from sliding relative to retaining base 1258 in a direction parallel to the plane of adapter plate 1204. When locking plate 1248 is pivoted away from the locking position, as shown in FIG. 13B, adapter packs 1206 can slide relative to retaining base 1258 to enable servicing and replacement of adapters 1210 and adapter packs 1206. An installer can also move adapter packs 1206 to create gaps to allow room for the installer's fingers.

Figure 14:
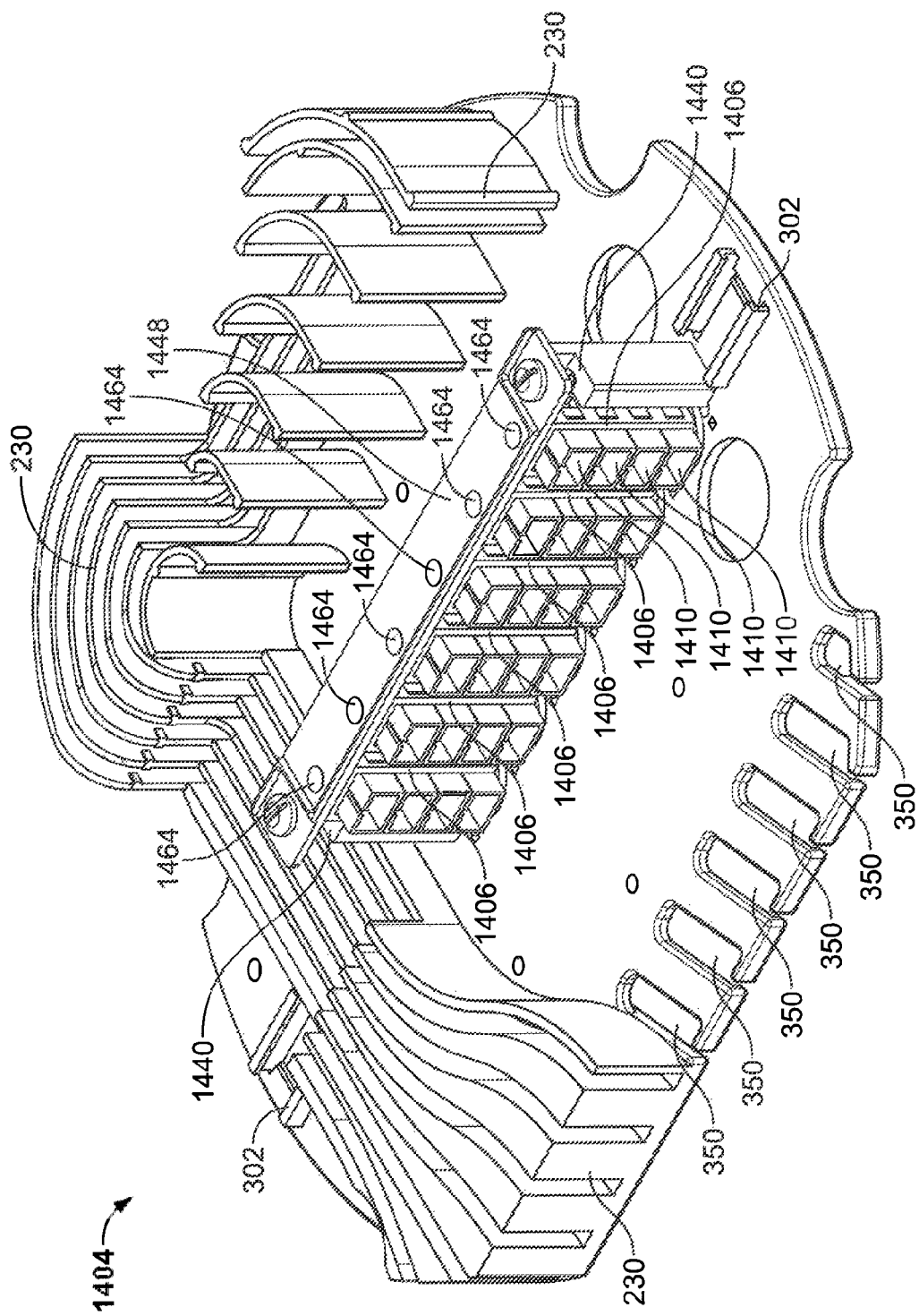
FIG. 14 illustrates an adapter plate with an adapter retaining system according to another embodiment.

FIGS. 14-17 illustrate another embodiment of an adapter retaining system that can be used with an FDT. FIG. 14 illustrates a perspective view of an adapter plate 1404 without spool 202. Adapter plate 1404 is configured to retain one or more adapter packs 1406 that can each rotate about an axis substantially perpendicular to the plane of adapter plate 1404. As shown in FIG. 14, adapter plate 1404 includes a pair of posts 1440 that extend from a surface of adapter plate 1404. Adapter plate 1404 also includes a locking plate 1448 that prevents adapters 1410 and adapter packs 1406 from moving away from adapter plate 1404. Locking plate 1448 is selectively coupled to the pair of adapter posts 1440. Locking plate 1448 includes a plurality of openings 1464 for receiving a plurality of guide protrusions 1466 (see FIGS. 15 and 16) of adapter packs 1406. Openings 1464 form a rotatable interface with adapter packs 1406 as further described below.

Figure 15:
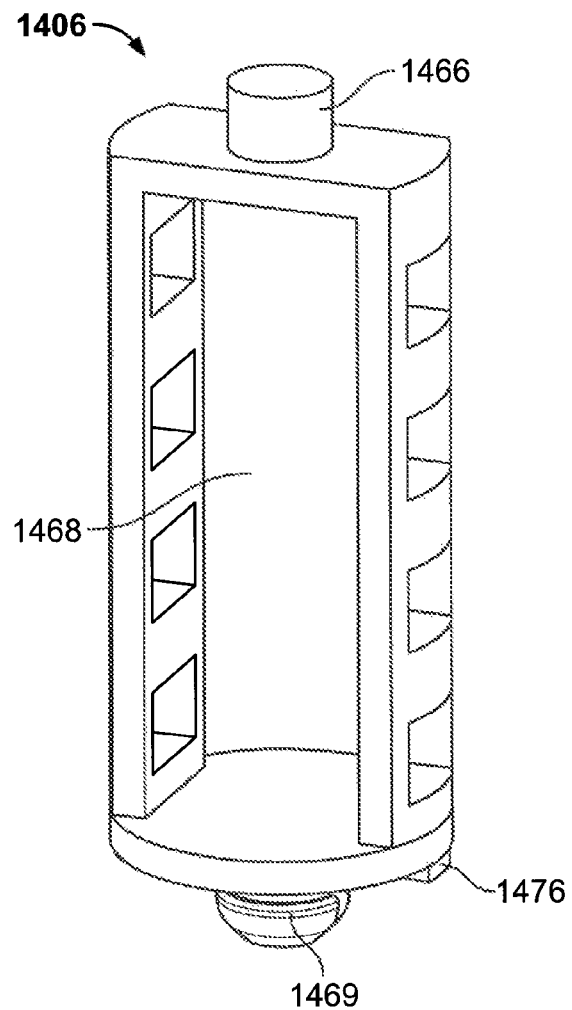
FIG. 15 depicts an adapter pack used with the adapter retaining system of FIG. 14 without adapters.
Figure 16:
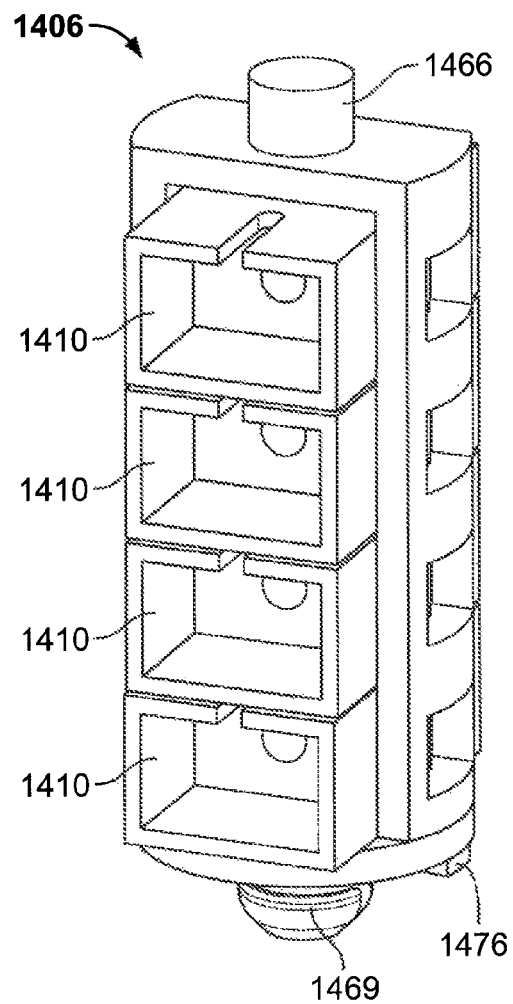
FIG. 16 depicts the adapter pack of FIG. 15 with adapters.
Figure 17:
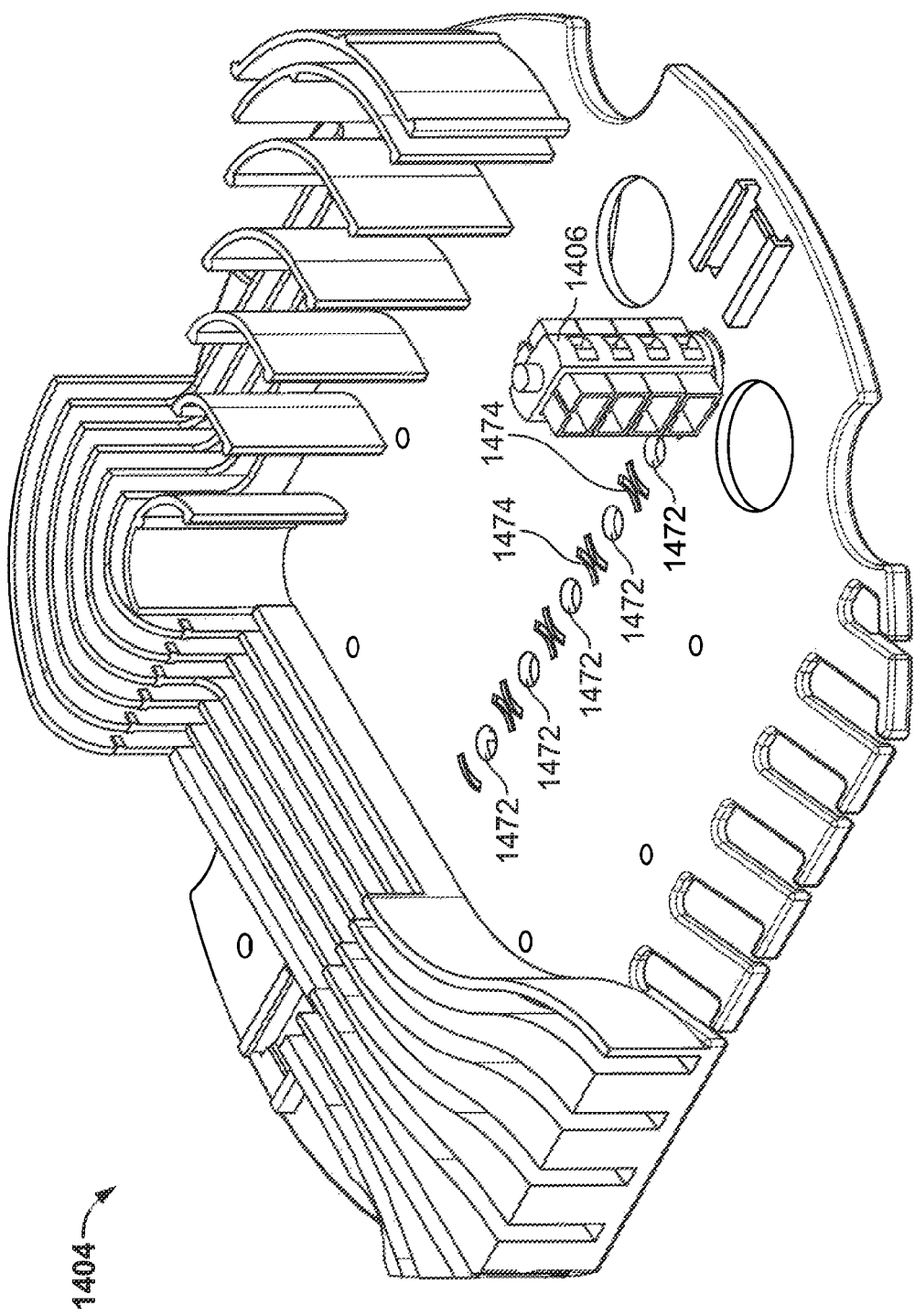
FIG. 17 illustrates the adapter plate of FIG. 14 with the adapter packs removed.

As best seen in FIGS. 15 and 16, each adapter pack 1406 defines a center hollow chamber 1468 for housing one or more adapters 1410. For example, each adapter pack 1406 can house four adapters 1410 as shown in FIG. 17. Each adapter pack 1406 includes a guide protrusion 1466 that extends from a surface of adapter pack 1406. Protrusions 1466 have a shape that corresponds to the shape of openings 1464 in locking plate 1448, creating rotatable interfaces between adapter packs 1406 and locking plate 1448. For example, protrusions 1466 and openings 1464 can have a circular shape. The protrusions 1466 and openings 1464 can have any other suitable shape that would allow adapter packs 1406 to rotate about an axis substantially perpendicular to the plane of adapter plate 1404. Each adapter pack 1406 also includes a protrusion 1469 extending from a surface of adapter pack 1406 opposite from protrusion 1466. Protrusion 1469 and protrusion 1466 are coaxial to allow for rotation of adapter pack 1406. Protrusion 1469 has a shape that corresponds to a shape of an opening 1472 defined in adapter plate 1404 such that protrusion 1469 can be received in opening 1472 to create a rotatable interface between adapter pack 1406 and adapter plate 1404. For example, protrusion 1469 and opening 1472 can have a circular shape. Protrusion 1469 can also be configured for a snap fit within opening 1472, preventing adapter pack 1406 from moving away from adapter plate 1404 while allowing adapter pack 1406 to rotate about an axis substantially perpendicular to the plane of adapter plate 1404.

FIG. 17 is a perspective view of adapter plate 1404 with all but one adapter pack 1406 removed. As shown in FIG. 17, adapter plate 1404 defines a pair of arcuate slots 1474 surrounding each opening 1472. Adapter pack 1406 can include one or more protrusions 1476 extending from a surface of adapter pack 1406 towards adapter plate 1404, for example, the same surface from which protrusion 1469 extends. As shown in FIGS. 16 and 17, protrusion(s) 1476 extend from the peripheral edge of adapter pack 1406. Arcuate slots 1474 defined in adapter plate 1404 slidably receive respective protrusion(s) 1476. When protrusions 1476 are seated in arcuate slots 1474, rotation of adapter pack 1406 is limited to the travel of protrusion(s) 1476 within arcuate slots 1474.

Figure 18:
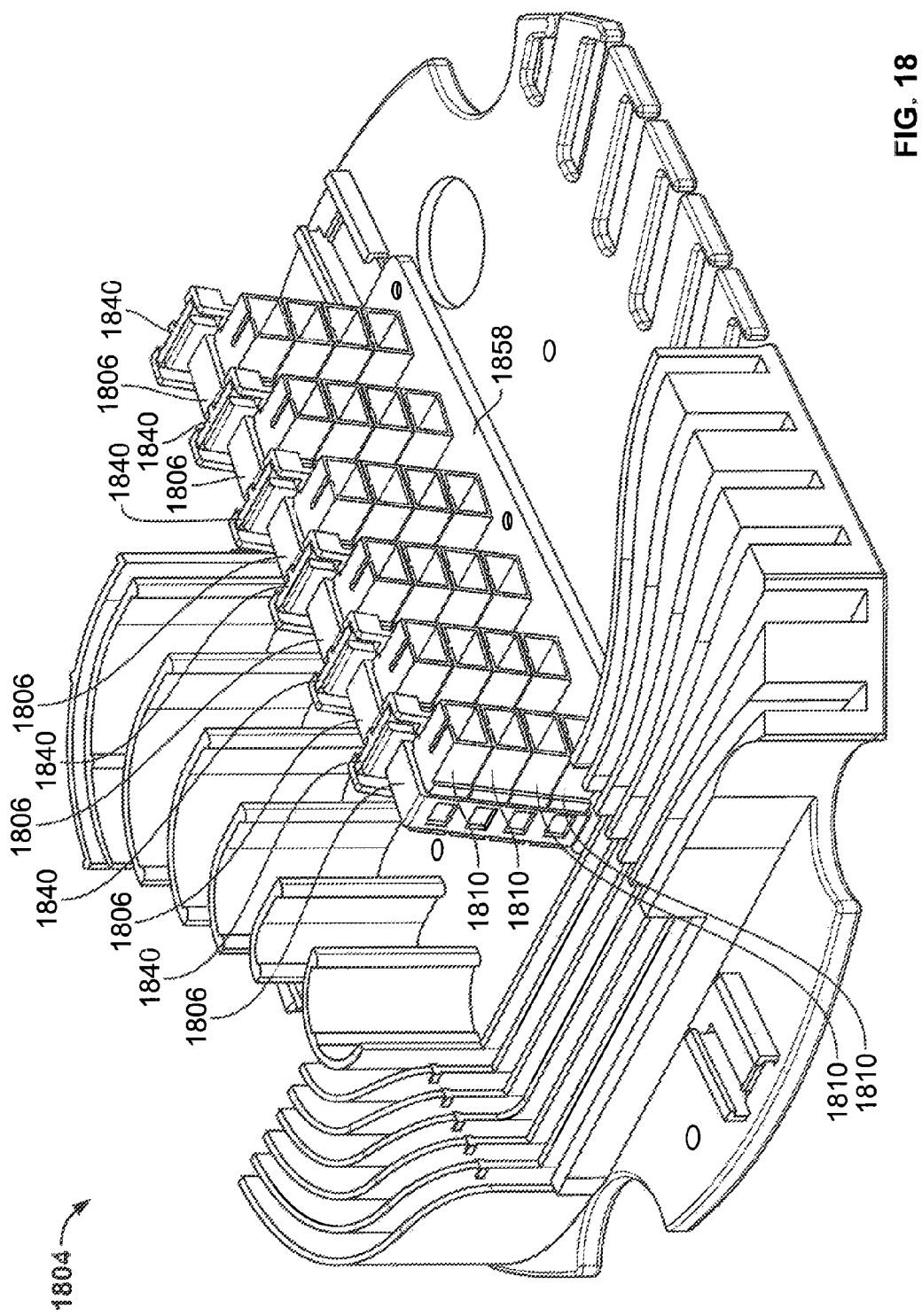
FIG. 18 depicts an adapter plate with an adapter retaining system according to an embodiment.
Figure 19:
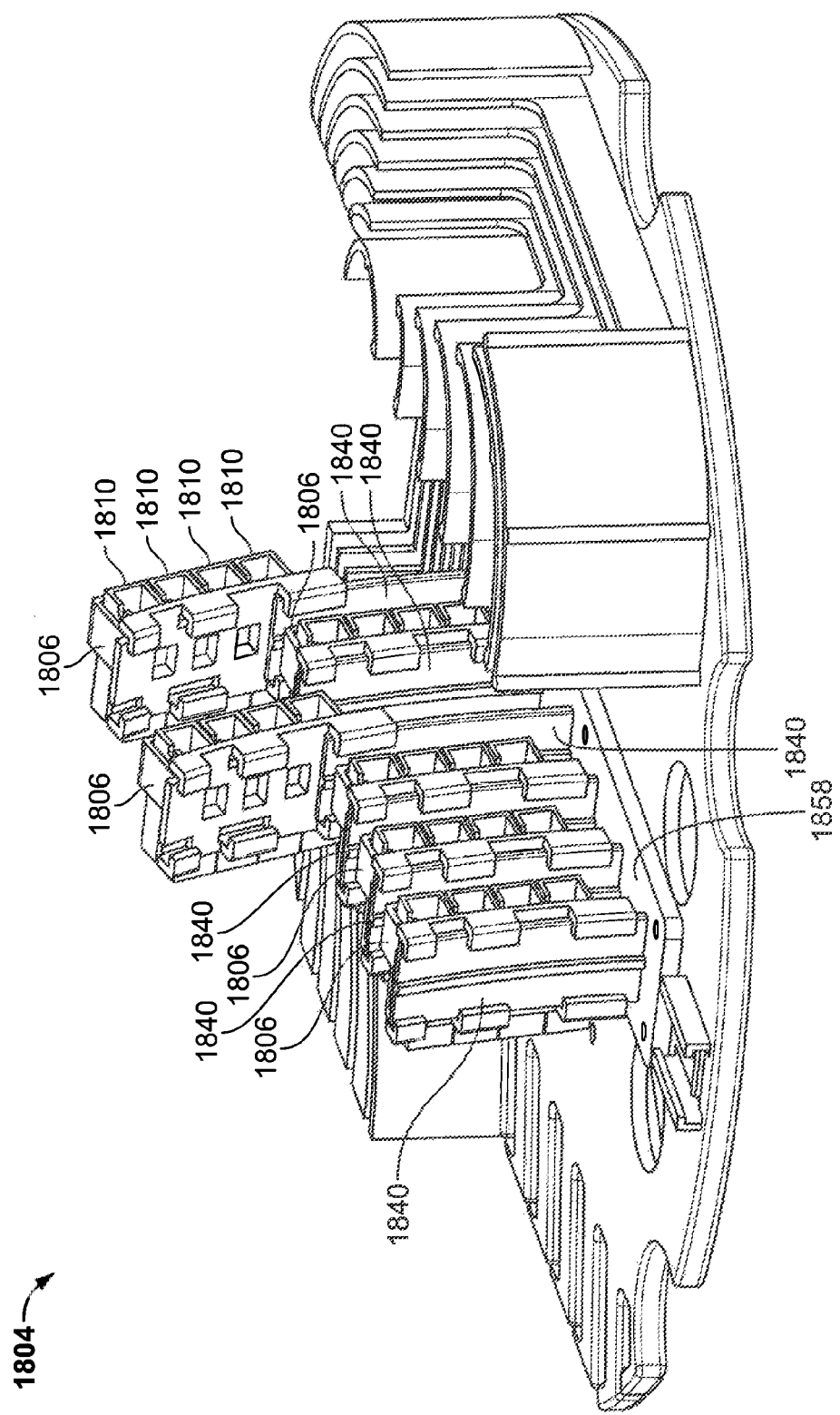
FIG. 19 illustrates a rear perspective view of the adapter plate of FIG. 18.
Figure 20:
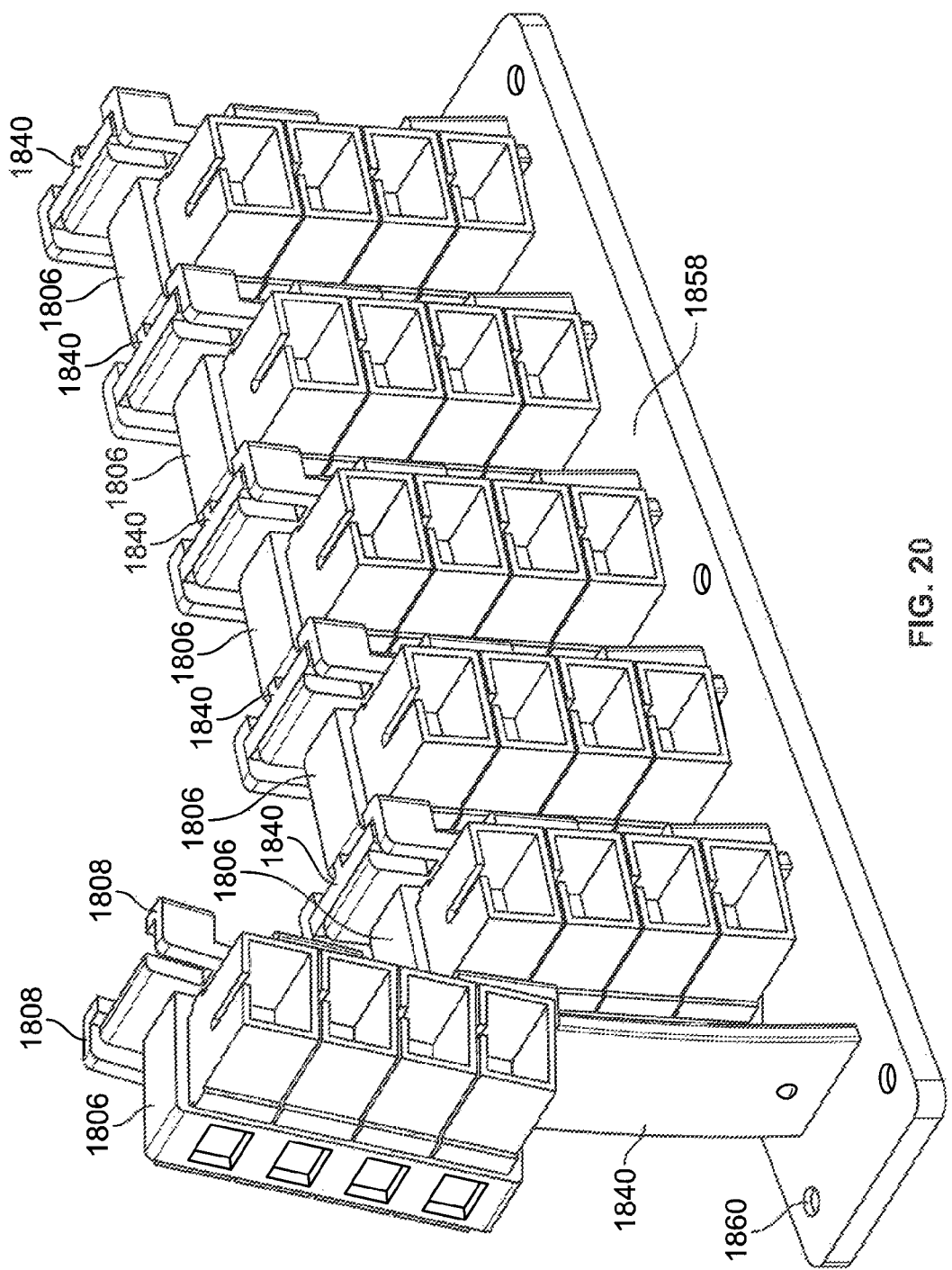
FIG. 20 is a perspective view of the adapter retaining system of FIG. 18 removed from the adapter plate.

FIGS. 18-21 illustrate another embodiment of an adapter retaining system that can be used with an FDT. FIGS. 18 and 19 illustrate front and rear perspective views, respectively, of an adapter plate 1804 without spool 202. FIG. 20 depicts a perspective view of the adapter retaining system removed from adapter plate 1804. The adapter retaining system includes one or more adapter posts 1840 and one or more respective adapter packs 1806. Adapter packs 1806 house one or more adapters 1810. Adapter posts 1840 extend away from a surface, for example, the front surface, of adapter plate 1804.

Figure 21:
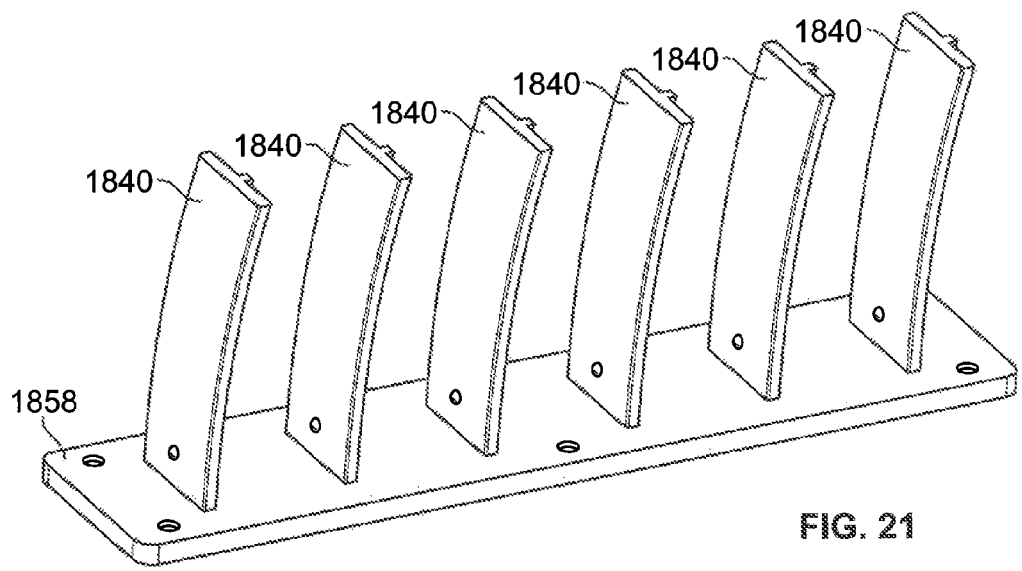
FIG. 21 depicts adapter posts of the adapter retaining system of FIGS. 18 and 19 without adapter packs.

FIG. 21 depicts the adapter retaining system of FIGS. 18-20 without adapter packs 1840. As shown in FIGS. 18-21, adapter posts 1840 extend from a surface of a retaining base 1858. Retaining base 1858 is configured to mount on a surface of adapter plate 1804. Retaining base 1858 can be secured to adapter plate 1804 by using any suitable fastener (s), such as self-tapping screws, or any suitable adhesive. In another embodiment, retaining base 1858 is integral with adapter plate 1804. In yet another embodiment, adapter posts 1840 extend directly from a surface of adapter plate 1804 such that retaining base 1858 can be omitted.

Each adapter post 1840 is curved. Each adapter post 1840 can be curved along the entire length of the adapter post, or each adapter post 1840 can be curved only along a portion, for example, the distal portion, of the adapter post. As shown in FIGS. 18-21, each adapter post 1840 can be arcuate with a radius, for example, ranging from about 175 mm to about 225 mm. In other embodiments, adapter posts 1840 can have other suitable curved shapes.

Figure 22:
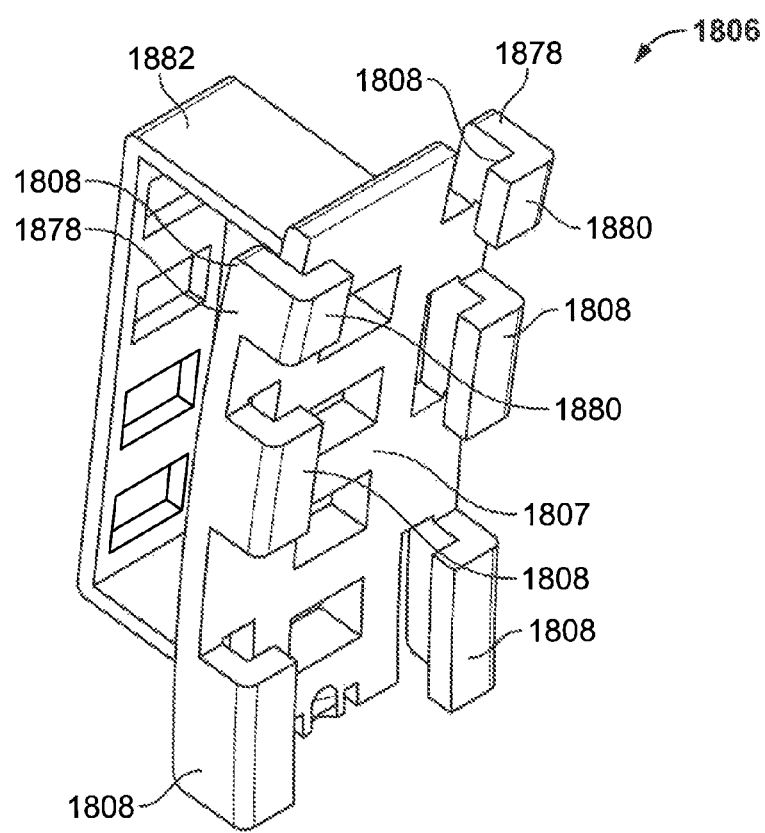
FIG. 22 illustrates an adapter pack used with the adapter posts of FIG. 21.

FIG. 22 is a rear perspective view of adapter pack 1806 used with adapter posts 1840. Adapter pack 1806 is configured to slidably engage a respective post 1840 such that adapter pack 1806 can move away from and towards a surface of adapter plate 1804 along a line of travel that corresponds to the curved shape adapter post 1840. Adapter pack 1806 includes a surface 1807, for example, a rear surface, that is adjacent adapter post 1840 when engaged therewith. Surface 1807 is curved to correspond to the curved shape of adapter post 1840. Adapter pack 1806 also includes one or more engagement members 1808 that engage adapter post 1840 such that adapter pack 1806 can slide relative to adapter post 1840 generally away from and towards a surface of adapter plate 1804, while substantially preventing all other movement of adapter pack 1806 relative to post 1840. As shown in FIG. 22, adapter pack 1806 includes six engagement members 1808. Engagement members 1808 are generally L-shaped and comprise a leg 1878 that extends from surface 1807 and a shoulder 1880 that extends from leg 1878 towards a center of adapter pack 1806. Surface 1807 and engagement members 1808 collectively define a cavity that can slidably receive a respective adapter post 1840. Engagement member(s) 1808 can have any other suitable configuration that allows sliding engagement between adapter pack 1806 and adapter post 1840.

As shown in FIG. 22, adapter pack 1806 also includes a body portion 1882. Body portion 1882 is configured to couple with one or more adapters 1810. Body portion 1882 defines a hollow chamber for housing adapters 1810. Adapter pack 1806 can house four adapters 1810 as shown in FIGS. 18-20. In other embodiments, adapter pack 1806 can house less than or more than four adapters 1810.

When adapter packs 1806 are engaged with adapter posts 1840, an installer can move adapter pack 1806 away from adapter plate 1804 to gain easy access to adapters 1810 as seen in FIG. 19 and FIG. 20. Once the fiber optical cables are coupled with a desired adapter 1810, an installer can move adapter pack 1806 back towards adapter plate 1804 for compact storage as seen in FIG. 18.

The embodiments of the adapter retaining systems described above with reference to FIGS. 9-22 can be used with FDT 102, FDT 802, or with any other fiber optic devices that use similar adapters, for example, fiber distribution hubs or fiber collector assemblies. Additionally, a single FDT can use one or more of the above-described adapter retaining system embodiments. While an illustrative embodiment of the invention has been described above, it is, of course, understood that various modifications will be apparent to those of ordinary skill in the art. Such modifications are within the spirit and scope of the invention, which is limited and defined only by the appended claims.

The invention claimed is:

1. An enclosure-less fiber optic terminal comprising:
a base plate;
a spool rotatably mounted to the base plate for housing an input fiber cable;
an adapter for securing a connection between a fiber of the input fiber cable and a fiber of an output fiber cable; and
an adapter plate having a cable guide defining a channel for routing the output fiber cable from the adapter,
wherein the fiber optic terminal does not include an enclosure.

2. The enclosure-less fiber optic terminal of claim 1, wherein the spool is configured to store at least 350 ft. of two separate 12-fiber input fiber cables.

3. The enclosure-less fiber optic terminal of claim 1, wherein the cable guide is configured to allow up to a 70 mm. boot on a cable connector of the output fiber cable and up to a 4.8 mm. diameter of the output fiber cable.

4. The enclosure-less fiber optic terminal of claim 1, wherein the adapter is configured for use with a Splice On Connector.

5. The enclosure-less fiber optic terminal of claim 1, wherein the cable guide is configured to minimize bend loss within the output fiber cable.

6. An enclosure-less fiber optic terminal comprising:
a base plate;
a spool rotatably mounted to the base plate for housing an input fiber cable:
an adapter for securing a connection between a fiber of the input fiber cable and a fiber of an output fiber cable; and
an adapter plate having a cable guide defining a channel for routing the output fiber cable from the adapter, wherein the channel is curved, and wherein a radius of curvature of the channel is greater than a minimum bend radius of the output fiber cable.

7. The enclosure-less fiber optic terminal of claim 1 further comprising a second adapter for securing a connection between a second fiber of the input fiber cable and a fiber of a second output fiber cable, wherein the cable guide defines a second channel for routing the second output fiber cable from the second adapter.

8. The enclosure-less fiber optic terminal of claim 1, wherein the adapter plate further comprises a second cable guide defining a channel for routing the output fiber cable from the adapter, the channel of the second cable guide being aligned with the channel of the first cable guide.

9. The enclosure-less fiber optic terminal of claim 8, wherein the channels of the first cable guide and of the second cable guide each turn the output fiber cable 90 degrees.

10. The enclosure-less fiber optic terminal of claim 8, wherein the adapter plate further comprises a third cable guide defining a channel for routing the output fiber cable from the adapter, the channel of the third cable guide being aligned with the channel of the second cable guide.

11. The enclosure-less fiber optic terminal of claim 8, wherein the adapter plate further comprises a retaining slot for aligning the input fiber cable with the adapter.

12. An enclosure-less fiber optic terminal comprising:
a base plate;
a spool rotatably mounted to the base plate for housing an input fiber cable;
an adapter for securing a connection between a fiber of the input fiber cable and a fiber of an output fiber cable;
an adapter plate having a cable guide defining a channel for routing the output fiber cable from the adapter; and
a lock for preventing the adapter from moving perpendicularly away from the adapter plate, the lock comprising
a pair of posts extending from the base plate; and
a plate extending between each post, the plate being configured to selectively couple with the pair of posts such that the plate covers the adapter.

13. An enclosure-less fiber optic terminal comprising:
a base plate;
a spool rotatably mounted to the base plate for housing an input fiber cable;
an adapter for securing a connection between a fiber of the input fiber cable and a fiber of an output fiber cable; and
an adapter plate having a cable guide defining a channel for routing the output fiber cable from the adapter,
wherein the spool comprises a first spooling area defined by a lower flange and an intermediate flange, and a second spooling area defined by the intermediate flange and the adapter plate.

14. The enclosure-less fiber optic terminal of claim 13, wherein the fiber optic terminal does not include an enclosure.

15. The enclosure-less fiber optic terminal of claim 6, wherein the fiber optic terminal does not include an enclosure.

16. The enclosure-less fiber optic terminal of claim 12, wherein the fiber optic terminal does not include an enclosure.

\* \* \* \* \*